United States Patent [19]

Loubier

[11] 4,428,738
[45] Jan. 31, 1984

[54] RESILIENTLY COMPLIANT ROTARY COUPLING

[75] Inventor: Robert J. Loubier, Fort Wayne, Ind.
[73] Assignee: Xolox Corporation, Fort Wayne, Ind.
[21] Appl. No.: 307,784
[22] Filed: Oct. 2, 1981
[51] Int. Cl.³ .............................................. F16D 3/78
[52] U.S. Cl. ........................................ 464/93; 464/98
[58] Field of Search ............... 464/71, 73, 87, 92, 464/93, 98, 180, 903

[56] References Cited

U.S. PATENT DOCUMENTS

| | | |
|---|---|---|
| 3,308,637 | 3/1967 | Deuring ........................ 464/93 |
| 3,425,240 | 2/1969 | Feller et al. ................... 464/93 |
| 3,793,849 | 2/1974 | Downey ........................ 464/93 |
| 3,798,924 | 3/1974 | Downey ........................ 464/93 |
| 3,823,577 | 7/1974 | Smith ........................ 464/903 X |

FOREIGN PATENT DOCUMENTS

| | | |
|---|---|---|
| 48655 | 5/1938 | France ........................ 464/98 |
| 55-54723 | 4/1980 | Japan ........................ 464/93 |
| 319693 | 4/1957 | Switzerland ................... 464/98 |

*Primary Examiner*—Stuart S. Levy
*Assistant Examiner*—Daniel P. Stodola
*Attorney, Agent, or Firm*—George A. Gust

[57] ABSTRACT

A rotary coupling device comprises driving and driven elements which are rotatable about a given axis. A coupling member of elastomeric material rotatable about the aforesaid axis is interposed between such elements for imparting rotary motion therebetween. The coupling member is connected at spaced circumferential points to the driving and driven elements, respectively, and is so constructed as to have two different torque characteristics, the first being resilient in a range of torques varying from zero up to a predetermined value and the second being relatively non-yielding for torque values higher than such predetermined maximum. The imposition of torques above said predetermined value results in substantially direct drive between such elements and those below said value results in a resiliently flexible drive therebetween.

5 Claims, 13 Drawing Figures

RESILIENTLY COMPLIANT ROTARY COUPLING

BACKGROUND OF THE INVENTION

1. Field of the Invention

The present invention relates to rotary couplings and more particularly to couplings which minimizes the transmission of incremental, rapid torque variations from a driving to a driven element.

2. Description of the Prior Art

Rotary couplings are used to connect electric motors to mechanisms to be driven thereby. It is not uncommon for the shafts of such motors to rotate unevenly in the form of incremental changes of speed which occur rapidly. Under a suitable strobe light, such uneven rotation is observed as rotational jittering or vibration. This vibration is, of course, transmitted to the mechanism connected to the motor.

For some applications, the effects of such vibration are deleterious to the proper functioning and wear life of the mechanism.

Typical prior art couplings may be found in the following listed prior art U.S. Pat. Nos.: 1,323,850; 2,396,353; 2,742,770; 3,425,240; 3,793,849; 4,037,431; 4,114,472 and 4,193,740.

SUMMARY OF THE INVENTION

The present invention relates to a rotary coupling device which comprises driving and driven elements which are rotatable about a given axis. A coupling member of elastomeric material also rotatable about the same axis is interposed between such elements for imparting rotary motion therebetween. Such member has first and second torque connections with such driving and driven elements, respectively, and is so constructed as to have two different torque characteristics, the first being resilient in a range of torques varying from zero up to a predetermined value, and the second being relatively non-yielding for torque values higher than such predetermined maximum. Thus, the imposition of torques above such predetermined value results in substantially direct drive between the driving and driven elements, and for torque values below such predetermined value results in a resiliently flexible drive.

More specifically, the aforesaid elements and member are disc-like with the coupling member being sandwiched therebetween. The coupling member is provided with two cross-slots defined by spaced walls movable toward and away from each other, respectively. The walls of one slot are engageable when torque exceeds the predetermined maximum thereby resulting in direct drive. The slots further terminate near the periphery of the coupling member thereby providing a relatively thin wall section at the slot ends. This thin wall section is flexibly resilient under torques within the aforesaid first characteristic. With torque loads applied to the coupling member within the first characteristic, rotary vibration of the motor shaft is suitably dampened and isolated from the output side of the coupling device.

It is an object of this invention to provide a rotary coupling device for dampening or isolating vibration.

The above-mentioned and other features and objects of this invention and the manner of attaining them will become more apparent and the invention itself will be best understood by reference to the following description of an embodiment of the invention taken in conjunction with the accompanying drawings.

DESCRIPTION OF THE PREFERRED EMBODIMENT

Figure 1:
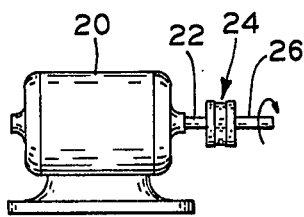
FIG. 1 is a side view of a typical electric motor having a coupling device of this invention secured to the output shaft thereof.
Figure 2:
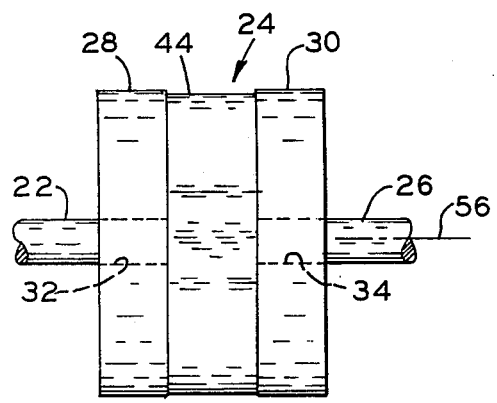
FIG. 2 is a side view of such coupling device with input and output shafts connected thereto.
Figure 3:
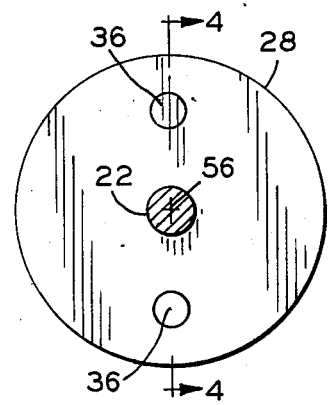
FIG. 3 is a view of one of the ends of the device of FIG. 2.
Figure 4:
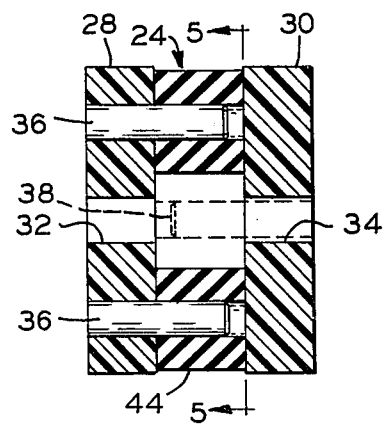
FIG. 4 is a cross section taken substantially along section line 4—4 of FIG. 3.

Referring to the drawings, an electric motor 20 has an output shaft 22 to which is connected a coupling device 24 of this invention. Another output shaft 26 also connects to the coupling device 24, the two shafts 22 and 26 being coaxial and vibrationally isolated from each other by means of this coupling device 24.

The coupling device 24 includes driving and driven elements or discs 28 and 30, respectively, having coaxial bores 32 and 34 which receive shafts 22 and 26, respectively. Each of the discs 28 and 30 are provided with two diametrically spaced pins which project axially therefrom, pins 36 being in the disc 28 and pins 38 in the disc 30. The two discs 28 and 30 are preferably formed of a suitable, molded plastic with the ends of the pins being molded or otherwise rigidly secured therein.

Figure 8:
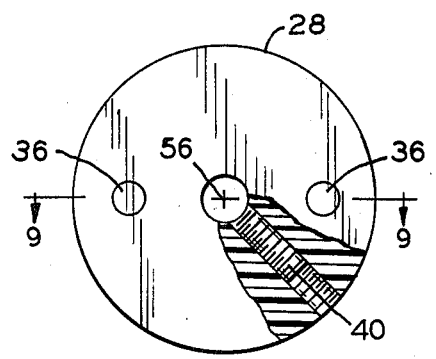
FIG. 8 is an end view like FIG. 3 partially cut away and sectioned showing the setscrew arrangement for locking one of the driving and driven elements to a shaft.
Figure 9:
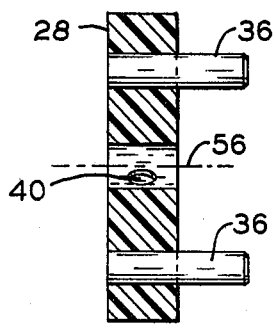
FIG. 9 is a cross section taken substantially along section line 9—9 of FIG. 8.
Figure 12:
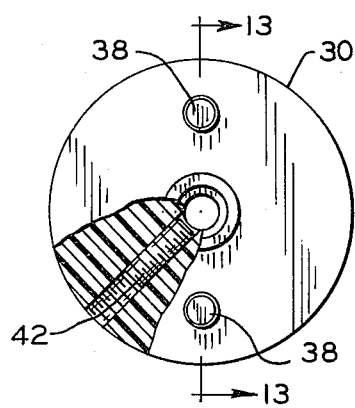
FIG. 12 is a view like FIG. 8 but of the other of the driving and driven elements.
Figure 13:
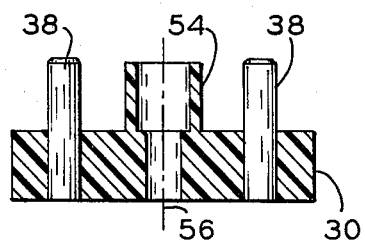
FIG. 13 is a cross section taken substantially along section line 13—13 of FIG. 12.

As shown in FIGS. 8 and 12, each of the discs are provided with set screws 40 and 42 for securing the discs separately to the respective shafts 22 and 26.

Between the two discs 28 and 30 is sandwiched a disc-like coupling member 44 of a size and shape as shown in the drawings which are substantially to scale. This member 44 is molded of a rubber-like material, such as a polyester elastomer, and is provided with two diametral slots 46 and 48 at right angles to each other and which intersect in the central region of the member 44. Each of the slots 46, 48 is further defined by spaced walls 50 and 52 which are essentially straight and parallel, these walls of one slot being smoothly rounded where they connect to the walls of the other slot. The central region of the member 44 is sufficiently open to receive with clearance an optional hub portion 54 of the output disc 30. The discs 28 and 30 as well as the coupling member 44 are symmetrically formed about the center axis 56 which coincides with the axes of the two shafts 22 and 26.

Between the slots 46 and 48, the coupling member 44 is provided with holes 58 and 60, these lying on two diameters 62 and 64 which are at right angles to each other. Additionally, these holes 58 and 60 are of such size, shape and position to receive with a sliding fit the respective pins 36 and 38 of the two discs 28 and 30. Since the fit is sliding, the pins 36, 38 can pivot within the respective holes 58 and 60.

The portions of the coupling member 44 surrounding the respective holes 58 and 60 are solid and relatively unyielding. However, those peripheral portions of the member 44 at the ends of the two slots 46 and 48, indicated by the numerals 66 and 68, are of relatively thin section and therefore resiliently flexible. Thus, the member 44 may be circumferentially distorted as shown for example in FIGS. 6 and 7.

Figure 5:
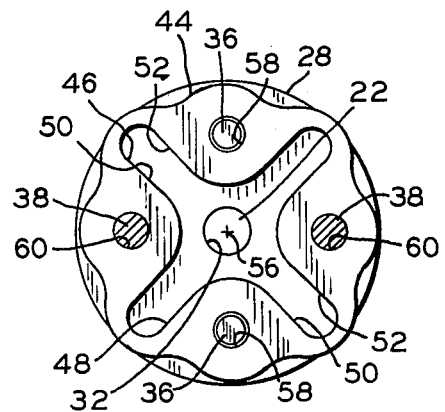
FIG. 5 is a cross section taken substantially along section line 5—5 of FIG. 4.
Figure 6:
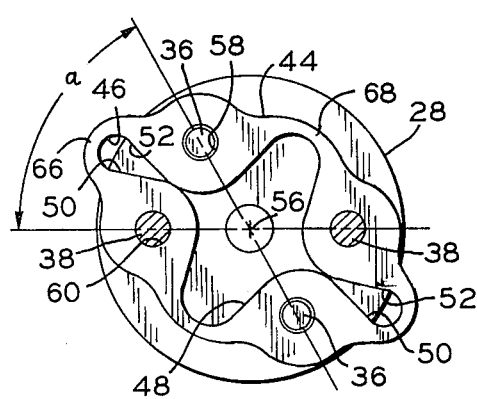
FIG. 6 is a view like FIG. 5 but with the elastomeric coupling member distorted under maximum torque to provide a direct drive.
Figure 7:
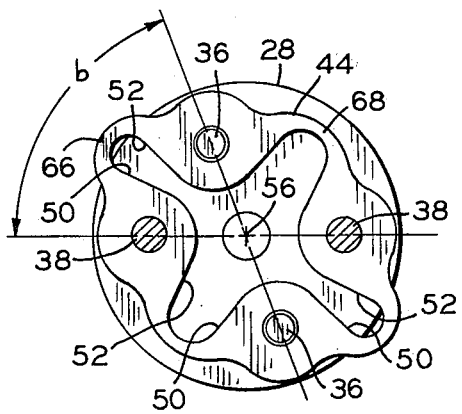
FIG. 7 is a view like FIG. 6 but with the coupling member subjected to lower torques thereby to dampen vibrations.
Figure 10:
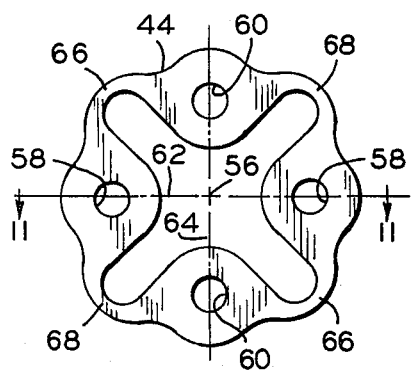
FIG. 10 is a side view of the coupling member.
Figure 11:
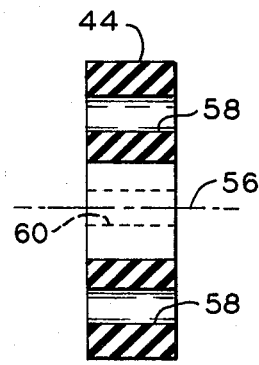
FIG. 11 is a cross section taken substantially along section line 11—11 of FIG. 10.

Referring now to FIGS. 6 and 7, operation of the coupling will be described. Under zero torque conditions, the torque member 44 will transmit rotation from the shaft 22 to the shaft 26 (FIG. 1) without distorting, or in other words by remaining in the shape shown in FIGS. 5 and 10. If a load should be applied to the output shaft 26 in a direction to resist rotation, torque is applied through the coupling 44 to the motor shaft 22. This torque is absorbed by the elastomeric member 44 which then distorts, as shown in FIGS. 6 and 7. The degree of distortion will depend upon the magnitude of the applied torque. This is explained as follows.

With the pins 36 from the disc 28 fitting into the holes 58, a counterclockwise driving force (as viewed in FIGS. 6 and 7) will be applied to the coupling member 44 about the axis 56. By reason of the pins 38 of the disc 30 slidably or pivotably fitting into the holes 60, and assuming counterclockwise rotation of the member 44 as being resisted, relative circumferential movement of the pins 36 and 38 will result, pins 36 moving toward pins 38. It may be stated at this time that in the preferred design the centers of the pins 36 and 38 and the holes 58 and 60 lie on a common circle or cylinder about the axis 56. This relative circumferential movement results in distorting the member 44 which is observed in the form of the walls 50 and 52 moving toward each other. If the torque exceeds a predetermined value, the walls 50 and 52 will be moved into engagement with each other, this resulting in a substantially direct drive between the pins 36 and 38, since the intervening material of the member 44 is substantially unyielding and nondeformable. The flexure of the member 44 occurs primarily at the wall sections 66 and 68 which permits the walls 50 and 52 of both slots 46 and 48 to move toward and away from each other, respectively, this being accommodated by the pivotal action of the pins 36, 38 within the respective holes 58, 60. The condition of the walls 50 and 52 engaging each other and thereby providing an essentially direct drive is shown in FIG. 6, with the relative positions of the pins 36 and 38 being indicated by the angle "a". For increased values of torque, the angle "a" will remain substantially the same.

If the value of torque is less than that at which engagement of the two walls 50 and 52 occurs, in other words is between zero and a predetermined maximum, the walls 50 and 52 will distort as shown in FIG. 7 but will not touch. If any sudden change in this torque should occur such as minimal, rhythmic vibration in the rotation of the motor shaft 22, and this change of torque does not approach the maximum value, the wall sections 66 and 68 of the coupling member 44 will flex thereby dampening or isolating this rotational change from the output shaft 26. The output shaft 26 will thus smoothly rotate which assures that the mechanism connected thereto will receive a smooth rotational drive. This torque condition below the maximum in FIG. 7 is illustrated by the angle "b" which marks the displacement between the pins 36 and 38.

Of importance is the fact that the member 44 is variably compliant. For torque values which progressively increase from zero to the maximum, the resistance to distortion of the member 44 increases accordingly. This variable compliance is reached as a maximum when the slot walls 50 and 52 engage thereby providing an essentially solid connection between the driving and driven elements 28 and 30.

In a working embodiment of this invention, the parts described had the following dimensions, these being exemplary only and not limitative of the invention.

| Diameter of discs 28 and 30 | 2 inches |
|---|---|
| Spacing of pins 36, 38 | 1 5/16 inches |
| Thickness of member 44 | ⅛ inch |
| Space between walls 50 and 52 | 5/16 inch |
| Thickness of wall sections 66, 68 | 1/16 inch |

While the coupling will function using only a single pin 36, 38, the preferred arrangement is to use two such pins as illustrated. Also, other means of fastening may be used such as bosses on the member 44 which fit into companion holes in the discs 28 and 30.

While there have been described above the principles of this invention in connection with specific apparatus, it is to be clearly understood that this description is made only by way of example and not as a limitation to the scope of the invention.

What is claimed is:

1. A rotary coupling device comprising driving and driven elements rotatable about a given common axis, a coupling member of solid elastomeric material rotatable about said axis and between said elements for imparting rotary motion therebetween, said member having first and second torque connections with said elements, respectively, said coupling member having two different torque characteristics, the first being resilient in a range of torques varying from zero up to a predetermined maximum, and said second being relatively non-yielding for torque values higher than said predetermined maximum, whereby imposition of torques above said predetermined maximum results in substantially direct drive between said elements and those below said value results in a resiliently flexible drive therebetween, said coupling member having diametral slots which intersect intermediate the ends thereof to thereby define an opening about said given axis and being circumferentially distortable, circumferentially adjacent ones of said slots thereby defining regions of solid material therebetween, said first and second torque connections being circumferentially spaced in opposite sides of said diametral slots, respectively, each said torque connection being in the form of a sliding pivotal connection between a region of said member and said elements whereby as said coupling member circumferentially distorts it pivots at each connection in the respective region with respect to an element, each said first torque connection being between said coupling member and one of said elements and each said second torque connection being between said coupling member and the other of said elements, each pivotal connection having a pivot axis which is spaced radially outwardly from, but is parallel to, said given axis, and said slots being of a length which provides at the opposite ends thereof flexible wall sections in said coupling member which permit variation in width of each slot as said coupling member circumferentially distorts, circumferential distortion of said coupling member comprising pivotal movement of said regions and correlative flexing movement of the wall sections said member being distortable when subjected to torque with the walls of said slots being movable toward and away from each other, respectively, the walls of one slot being engageable in response to torque above said predetermined maximum.

2. The device of claim 1 wherein there are two of said slots extending perpendicular to each other, each pivotal connection including at each region a hole in said member which receives a pin axially projecting from the respective driving and driven element, the centers of the holes for each connection lying on a straight diametral line through said given axis, and the straight diametral lines of said two connections being at right angles.

3. The device of claim 2 wherein said elements are in the form of discs and said coupling member also being disc-like and sandwiched between said elements, said slots terminating near the periphery of said member thereby providing that the wall sections thereat be relatively thin, said slots being defined by spaced, substantially parallel walls.

4. The device of claim 1 wherein said coupling member is disc-like and has two crossed-slots defined by spaced walls movable toward and away from each other, respectively, upon application of torque, said walls of one slot being engageable when said torque exceeds said predetermined maximum.

5. The device of claim 4 wherein said slots intersect near the center of said member and terminate near the periphery thereof thereby providing a relatively thin wall section thereat, the thin wall section being flexibly resilient under torques within said first characteristic.

* * * * *